US011592171B1

(12) United States Patent
McKay

(10) Patent No.: US 11,592,171 B1
(45) Date of Patent: Feb. 28, 2023

(54) CONTINUOUS ENCAPSULATED LINEAR LIGHTING PRODUCED IN SEGMENTS

(71) Applicant: Elemental LED, Inc., Reno, NV (US)

(72) Inventor: Brian McKay, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 17/412,951

(22) Filed: Aug. 26, 2021

(51) Int. Cl.
| | |
|---|---|
| *F21V 31/04* | (2006.01) |
| *F21S 4/28* | (2016.01) |
| *B29C 70/68* | (2006.01) |
| *B29C 70/72* | (2006.01) |
| *B29L 31/00* | (2006.01) |
| *F21Y 115/10* | (2016.01) |

(52) U.S. Cl.
CPC ............ *F21V 31/04* (2013.01); *B29C 70/683* (2013.01); *B29C 70/72* (2013.01); *F21S 4/28* (2016.01); *B29L 2031/747* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 5,263,290 A | 11/1993 | Gardner | |
| 8,262,250 B2 * | 9/2012 | Li | F21V 23/06 362/219 |
| 10,078,180 B1 * | 9/2018 | Wasserman | G02B 6/0095 |
| 10,582,616 B1 * | 3/2020 | Chen | H05K 1/144 |
| 10,753,596 B1 * | 8/2020 | Lopez-Martinez | F21S 4/20 |
| 10,801,716 B1 * | 10/2020 | Lopez-Martinez | F21S 4/22 |
| 11,098,887 B1 | 8/2021 | Irons | |
| 11,168,852 B1 * | 11/2021 | Irons | F21V 3/10 |
| 11,306,885 B1 | 4/2022 | Lopez-Martinez et al. | |
| 2010/0277914 A1 * | 11/2010 | Bachl | F21S 4/20 362/249.01 |
| 2016/0146439 A1 * | 5/2016 | Libon | F21V 31/04 29/848 |

(Continued)

FOREIGN PATENT DOCUMENTS

WO 2021076168 A1 4/2021

OTHER PUBLICATIONS

International Search Report issued in International Application No. PCT/US2022/041310 dated Nov. 21, 2022.

(Continued)

*Primary Examiner* — Alison L Hindenlang
*Assistant Examiner* — Andrés E. Behrens, Jr.
(74) *Attorney, Agent, or Firm* — United IP Counselors, LLC

(57) ABSTRACT

A method for making continuous encapsulated linear lighting is disclosed. In this method, a PCB is placed within a channel, and the channel is dammed by one or more stoppers. The dammed segment is filled and then caused or allowed to cure. The stoppers are then removed from their initial positions and moved along the channel. If one runs out of channel before the desired length of linear lighting is achieved, a second piece of channel is abutted to the previous segment of channel, the PCB is laid into it, and a segment is dammed, filled, and cured. The process continues iteratively until the desired length is achieved or more channel is required. The PCB may initially be cut to the full desired length and applied to the channel piecewise as needed.

10 Claims, 6 Drawing Sheets

(56) References Cited

U.S. PATENT DOCUMENTS

| | | | |
|---|---|---|---|
| 2018/0306413 A1* | 10/2018 | Tremaine | F21S 4/22 |
| 2020/0025343 A1* | 1/2020 | Labas | F21V 7/00 |
| 2020/0149716 A1* | 5/2020 | Collado | F21S 4/28 |
| 2021/0381663 A1* | 12/2021 | Monestier | F21V 7/005 |

OTHER PUBLICATIONS

Written Opinion issued in International Application No. PCT/US2022/041310 dated Nov. 21, 2022.

* cited by examiner

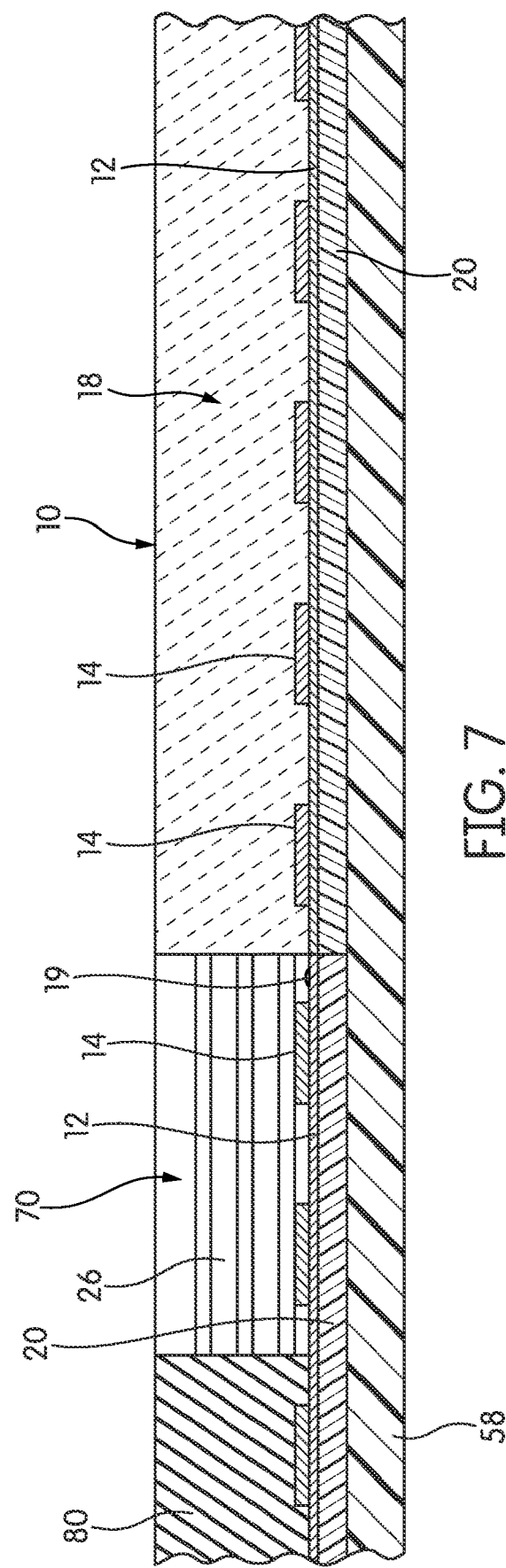

CONTINUOUS ENCAPSULATED LINEAR LIGHTING PRODUCED IN SEGMENTS

TECHNICAL FIELD

The invention relates to linear lighting, and more specifically, to encapsulated linear lighting.

BACKGROUND

Linear lighting is a broad class of solid-state lighting in which an elongate, narrow printed circuit board (PCB) is populated with light-emitting elements. Usually, those light-emitting elements are light-emitting diode (LED) light engines spaced at a regular pitch along the PCB. However, organic LED (OLED) light-emitting elements and other types of light-emitting elements may be used. The PCB may be either flexible or rigid. When flexible PCB is used and an adhesive is added to its reverse, the product is referred to in the industry as tape light.

Combined with an appropriate power supply, a strip of linear lighting may serve as a finished luminaire in its own right, or it may be used as a raw material in the construction of more complex luminaires. In more complex luminaires, metal channels, reflectors, lenses, and any number of other elements may be added to control or direct the light emitted by the linear lighting.

One reason why a strip of linear lighting is often placed in a channel or provided with other structure is that strips of linear lighting can be easily damaged. In essence, a strip of linear lighting is a collection of microelectronic circuits on a PCB. Thus, it is susceptible to any number of issues, ranging from electrostatic discharge to fouling by foreign material. A common solution to these sorts of susceptibilities is to encapsulate the linear lighting in a polymeric covering.

There are several ways to encapsulate a strip of linear lighting. One such way is to extrude a polymeric jacket around a strip of linear lighting, and then use endcaps or other such structures with a sealant to seal the ends. Another way to produce an encapsulation is to pour a polymer resin over the strip of linear lighting and then allow the resin to cure. In some cases, this can be done by exposing the uncured polymer to energy, like ultraviolet light, that causes the polymer to cure, while in other cases, two-part polymer systems that include a base polymer and a catalyst are used. This second process, involving poured liquid resins, most often produces a solid encapsulation and is sometimes referred to as potting. Silicone and polyurethane resins are popular for both kinds of encapsulation.

Some manufacturers have begun to produce encapsulation machines specifically for encapsulating LED linear lighting. One example is the CV SMART line of machines from Demak Group (Torino, Italy). This line of encapsulation machines is adapted to dispense two-part polyurethanes and keeps the resin components under vacuum during storage and dispensing in order to eliminate the need to de-gas mixed resin. Some machines in this line are computer-controlled, with a movable dispensing head capable of, e.g., 2.5-degree-of-freedom programmed movement to dispense resin in metered quantities.

Because this kind of encapsulation process involves pouring resin onto or around a strip of linear lighting, rather than extruding a coating from a die, a typical encapsulation machine can only encapsulate a length of linear lighting equal to the size of its working bed. This means that encapsulation machines can be long. For example, a machine of this type may have a working bed with a length of 5 or 10 meters (16.4 or 32.8 ft). In some cases, the working bed may be shuttled into a curing oven of the same length, and more than one curing oven may be provided in order to increase throughput. The combination of a long working bed with one or more long curing ovens means that these machines can be of enormous length—in some cases, 15 meters (49 ft) or more.

However long an encapsulation machine may be, there will always be some cases in which it is desirable or necessary to make an encapsulated strip of linear lighting that is longer than the working bed of the machine. Unfortunately, there is no good process for making a continuous strip of linear lighting that is longer than the working bed or table of the machine.

BRIEF SUMMARY

One aspect of the invention relates to a method for making continuous encapsulated linear lighting. In this method, a PCB is placed within a channel, and the channel is dammed by one or more stoppers. The dammed segment is filled and then caused or allowed to cure. The stoppers are then removed from their initial positions and moved along the channel. If one runs out of channel before the desired length of linear lighting is achieved, a second piece of channel is abutted to the previous segment of channel, and the PCB is laid into it. Once more channel is laid down, the process continues iteratively until the desired length is achieved or more channel is required. In this method, it may be assumed that the PCB is initially cut to the full desired length and is applied to the channel piecewise as needed; however, in some cases, individual segments of PCB may be used, connected together as needed by soldered conductors or other such connectors. The method may be performed with the channel supported in a carrier.

In these methods, the channel is typically dammed with a stopper that has negative, complementary features to both the channel and the PCB, such that it can form a seal over the PCB when the PCB is installed in the channel. Stoppers of this type can be made by installing a linear lighting PCB in a channel, damming the channel at appropriate points, filling the channel with stopper material, causing or allowing the stopper material to cure, removing the cured stopper material from the channel, and cutting the stopper material to appropriate lengths.

Other aspects, features, and advantages of the invention will be set forth in the following description.

BRIEF DESCRIPTION OF THE DRAWING FIGURES

The invention will be described with respect to the following drawing figures, in which like numerals represent like features throughout the description, and in which:

FIG. 7 is a cross-sectional view illustrating the addition of a second channel to extend the linear lighting.

DETAILED DESCRIPTION

Figure 1:
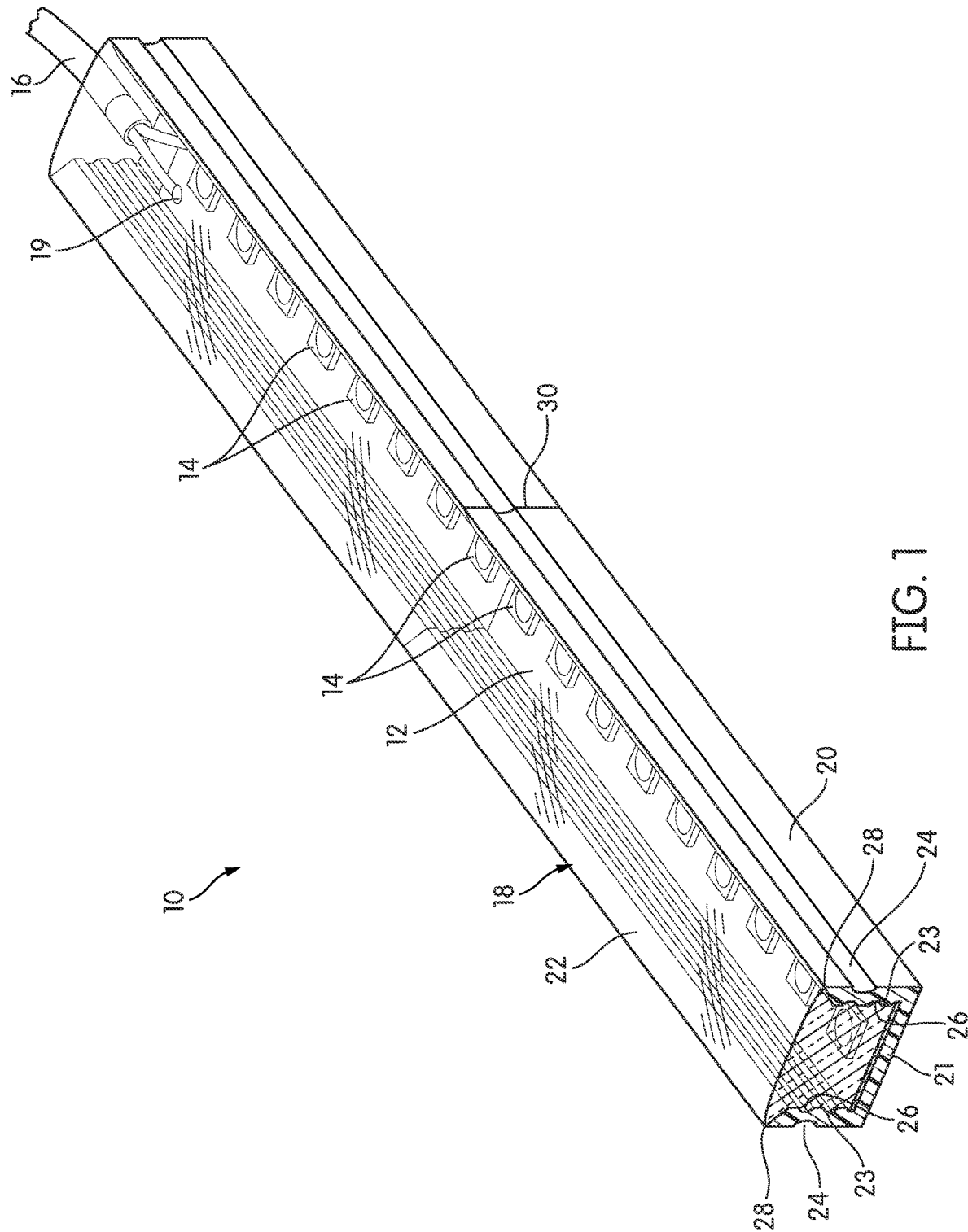
FIG. 1 is a perspective view of a strip of encapsulated linear lighting according to one embodiment of the invention.

Embodiments of the invention relate to processes for producing long lengths of continuous linear lighting in segments. Before describing those processes, it is helpful to describe the basic features of a strip of linear lighting produced according to these processes. To that end, FIG. 1 is a perspective view of a strip of encapsulated linear lighting, generally indicated at 10, according to one embodiment of the invention. At the core of the strip of encapsulated linear lighting 10 lies a long, narrow printed circuit board (PCB) 12, on which are disposed a plurality of LED light engines 14.

As the term is used here, "light engine" refers to an element in which one or more light-emitting diodes (LEDs) are packaged, along with wires and other structures, such as electrical contacts, that are needed to connect the light engine to a PCB. LED light engines may emit a single color of light, or they may include red-green-blue (RGBs) that, together, are capable of emitting a variety of different colors depending on the input voltages. If the light engine is intended to emit "white" light, it may be a so-called "blue pump" light engine in which a light engine containing one or more blue-emitting LEDs (e.g., InGaN LEDs) is covered with a phosphor, a chemical compound that absorbs the emitted blue light and re-emits either a broader or a different spectrum of wavelengths. The particular type of LED light engine is not critical to the invention. In the illustrated embodiment, the light engines are surface-mount devices (SMDs) soldered to the PCB 12, although other types of light engines may be used.

Although this description may focus on blue-pump LED light engines that produce so-called "white light" and on RGB LED light engines that can produce a plethora of light colors by additive color mixing, those are not the only types of light engines that may be used. For example, in some embodiments, organic LEDs (OLEDs) may be used.

To make a functional strip of encapsulated linear lighting 10, other components may be mounted on the PCB 12. In a typical power circuit for LED light engines, the current flow to the light engines is controlled. This may be done in the power supply, or it may be done by adding components directly to the PCB 12 to manage current flow. Linear lighting that is designed to control the current flow using circuit elements disposed on the PCB 12 is often referred to as "constant voltage" linear lighting. Linear lighting that requires the power supply to control the current flow is often referred to as "constant current" linear lighting. Constant-current linear lighting is often used when the length of the linear lighting is known in advance; constant-voltage linear lighting is more versatile and more easily used in situations where the length, and resulting current draw, is unknown or is likely to vary from one installation to the next.

The encapsulated linear lighting 10 may be either constant voltage or constant current. If the encapsulated linear lighting 10 is constant voltage, passive circuit elements like resistors are suitable current control components, although active circuit elements, like current control integrated circuits, may also be used.

Generally speaking, linear lighting may accept either high voltage or low voltage. While the definitions of "high voltage" and "low voltage" may vary depending on the authority one consults, for purposes of this description, "high voltage" should be construed to refer to any voltage over about 50V. High voltage typically brings with it certain enhanced safety and regulatory requirements. The encapsulated linear lighting 10 may be either high-voltage or low-voltage, although certain portions of this description may relate specifically to low-voltage linear lighting.

At one end, a jacketed power cable brings power to the PCB 12, and is usually connected to the PCB 12 by soldering to solder pads 19 that are provided on the PCB 12. However, various forms of connectors and terminal blocks may also be used.

The PCB 12 and the power cable 16 are fully encapsulated in the illustrated embodiment, meaning that a covering, generally indicated at 18, surrounds these components. The covering 18 provides a high degree of ingress protection, and depending on the polymer, may confer an ingress protection rating of IP68 or higher. While the covering may be completely solid with no gaps, in practice, there may be gaps and other features within the covering 18. For example, the covering 18 may include an air gap over the PCB 12 or other such features in order to modify or control the emission of light out of the encapsulated linear lighting 10.

The covering 18 may be a silicone polymer, a polyurethane polymer, or some other type of polymer system. Irrespective of the particular chemistry of the polymer system, the following discussion assumes that the covering 18 is comprised of a thermoset polymer system that is supplied in two or more liquid parts and is mixed and dispensed by a dispensing system. The resulting polymer resin, typically low-viscosity when dispensed, cures to a solid, either at room temperature or at elevated temperatures.

This description will generally assume that a polymer dispensing machine, such as the DEMAK CV SMART line of dispensing machines is used. However, it is perfectly possible to mix a quantity of encapsulating resin manually, de-gas it, and pour or otherwise apply it at a controlled rate manually. If precision is required, mixed resin can be metered with syringes or with any other known techniques for metering precise quantities of material. Thus, linear lighting 10 according to embodiments of the invention can be made without an encapsulation machine, or with a machine that is not automated.

It should be understood that the covering 18 may be either rigid or flexible. The PCB 12 itself may be either flexible or rigid as well. As those of skill in the art will understand, definitions of the terms "flexible" and "rigid" may be complex, contextual, and variable. For purposes of this description, it is sufficient to say that the solid covering 18 may have a range of possible durometer hardnesses, elastic moduli, and other mechanical properties. As one example of "flexible" and "rigid," the SEPUR 540 RT/DK 100 HV two-part polyurethane system (Special Engines S.r.l., Torino, Italy) has a durometer hardness of 68-75 Shore A at room temperature according to the ASTM D 2240 test standard, and may be considered flexible for these purposes, while the similar SEPUR 540 RT/DK 180 HV two-part polyurethane system has a durometer hardness of 75-78 Shore A, and may be considered rigid for these purposes. Ultimately, anything that can provide a degree of protection for the PCB 12 may be used.

To encapsulate linear lighting with poured liquid resin, the encapsulation is usually made in several parts. A base or channel is created first, the PCB is installed on the base or in the channel, and then the base or channel is filled or overcoated to create the final product. Here, the covering 18 has a channel 20. The channel 20 is manufactured first, the PCB 12 is installed in the channel 20, and then fill 22 is dispensed or deposited into the channel 20 to encapsulate the PCB 12.

The channel 20 has a bottom 21 and sidewalls 23 that arise and extend upwardly from the bottom 21. In the illustrated embodiment, the PCB 12 is installed along the interior bottom 21, although in other embodiments, the PCB 12 may be installed along either sidewall 23. The channel 20 may have external features that allow the strip of encapsulated linear lighting 10 to be used with mounting clips, channels, and other accessories that allow for mounting. In the illustrated embodiment, the channel 20 has a rounded groove 24 that runs the length of the channel 20 along the upper portion of each sidewall 23. These rounded grooves 24 allow for the use of a mounting clip.

Each sidewall 23 has a set of ridges 26 on the interior side. These ridges 26 extend the entire length of each sidewall 23 and at least a substantial portion of the height of each sidewall 23. Their purpose will be described in more detail below. However, as seen in FIG. 1, the fill 22 fills the channel 20 completely and conforms to the ridges 26. The sidewalls have sharp upper edges 28 that, in combination with surface tension, allow the fill 22 to assume a slightly convex, domed appearance, depending on the level to which the channel 20 is filled.

The channel 20 and the fill 22 would typically be made of the same material, or at least, the same type of material. For example, the channel 20 and the fill 22 may be made with the same two-part polyurethane or silicone resin system. In some cases, the channel 20 may be made of the same polymer or polymer system as the fill 22, but could have colorants or other additives relative to the fill 22. For example, the channel 20 could be colored white for reflectivity, or could include a ceramic, metallic, or other filler for heat conductivity. As may be apparent from the description above, if the channel 20 and the fill 22 are made from the same polymer with the same additives, their appearance would typically be the same, and it may be difficult or impossible to distinguish between the channel 20 and the fill 22 in the finished product.

The channel 20 may be made by extrusion. Even if the fill 22 is to be a two-part system that is deposited into the channel 20, extrusion of the channel 20 is possible. In that case, the channel 20 would typically be made with a polymer that is similar to the two-part polymeric system used for the fill 22. For example, if a two-part thermoset polyurethane is used for the fill 22, an extruded thermoplastic polyurethane may be used for the channel 20.

Although much of this description will assume that the channel 20 is polymeric, the channel 20 could be made of some other material, so long as the fill 22 will bond to it. For example, the channel 20 could be made of a cast or extruded metal, such as aluminum.

Many variations on the basic features shown in FIG. 1 are possible, all of them within the scope of the invention. For example, the encapsulated linear lighting 10 shown in FIG. 1 is considered in the industry to be "top-bend" linear lighting: the PCB 12 is on the bottom of the channel 20, and the orientation of the PCB 12 relative to the channel 20 is such that the finished linear lighting 10 bends up and down, relative to the coordinate system of FIG. 1. So-called "side-bend" linear lighting can also be made, and is shown, e.g., in U.S. patent application Ser. No. 17/117,410, filed Dec. 10, 2020, the contents of which are incorporated by reference herein in their entirety.

As shown in FIG. 1, there may be a slight discontinuity 30 visible in the channel 20, and the PCB 12 may be separated at that point as well. This will be explained below in more detail.

Figure 2:
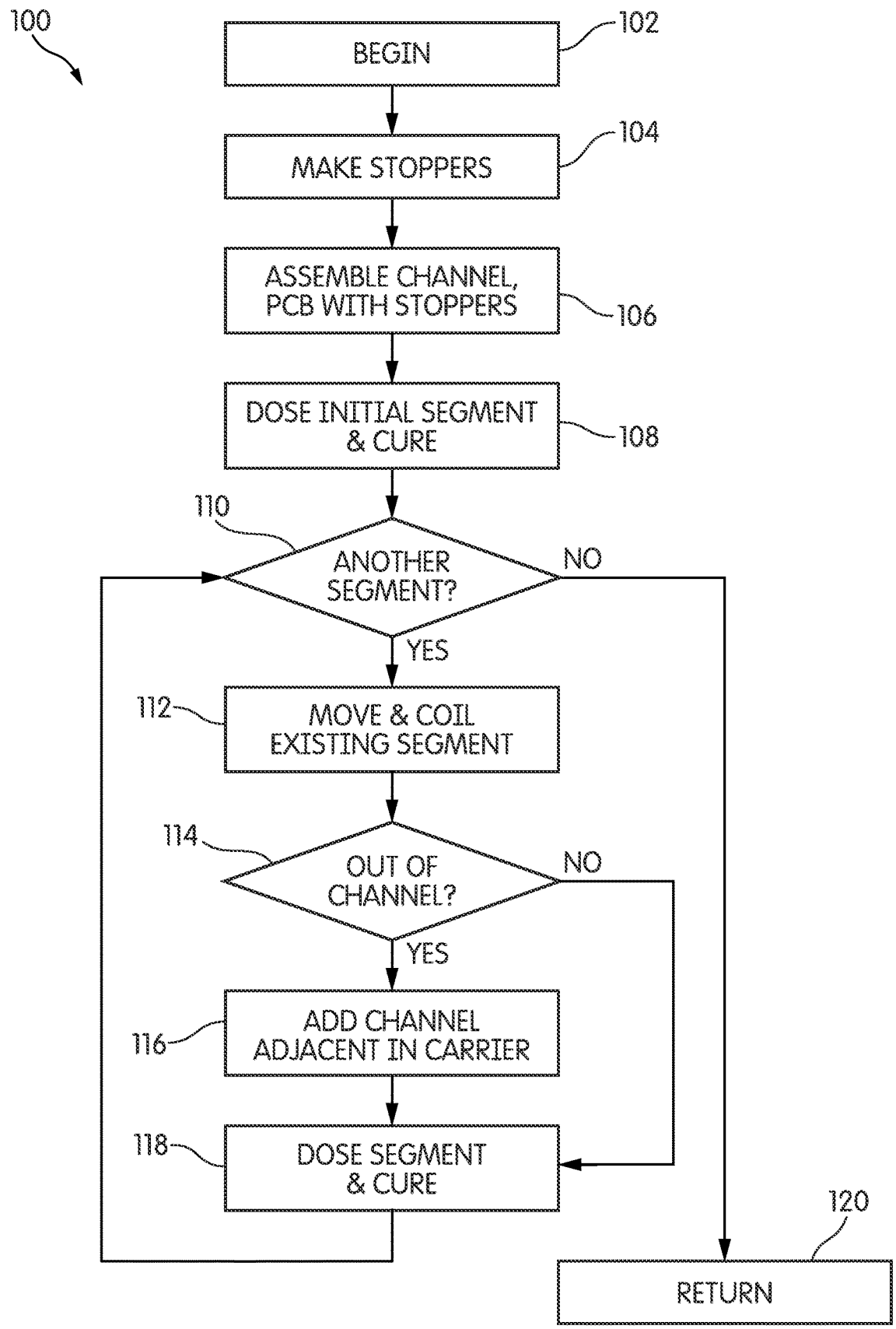
FIG. 2 is a flow diagram illustrating a method according to another embodiment of the invention.

FIG. 2 is a flow diagram of a method, generally indicated at 100, according to one embodiment of the invention. Method 100 is used to create continuous encapsulated linear lighting, such as the encapsulated linear lighting 10 described above with respect to FIG. 1, in segments. Method 100 may be used, for example, to create encapsulated linear lighting 10 that is longer than the working bed of an encapsulation machine. Method 100 may also be used to create encapsulated linear lighting in any circumstance in which it is desirable to work in segments, including situations in which it is desirable to make an encapsulation with varying properties along its length.

Method 100 begins at task 102 and continues with task 104. In task 104, stoppers appropriate for the type of encapsulated linear lighting are made. U.S. Pat. No. 10,801,716 to Lopez-Martinez et al. discloses the creation and use of stoppers and is incorporated by reference in its entirety. In the Lopez-Martinez patent, stoppers are used to dam the ends of channels in order to make linear lighting of arbitrary length without the need to use glue-in endcaps. Stoppers are also used to make several smaller pieces of encapsulated linear lighting of arbitrary length using the same channel.

The stoppers made in task 104 and used in embodiments of the invention are similar to the stoppers of the Lopez-Martinez et al. patent, except in one respect: the stoppers of Lopez-Martinez et al. are intended to seat in and make a seal against the channel alone, whereas stoppers in method 100 are intended to seat and make a seal against a channel 20 with a PCB 12 installed in it. As will be described below in more detail, these specialized stoppers allow encapsulated linear lighting 10 to be made in segments.

Task 104 would typically be performed by installing a strip of the desired linear lighting in a channel, damming the ends of the channel, and then filling the channel with stopper material. If the resin to be used is polyurethane, for example, a silicone resin may be used for the stoppers. As was described in Lopez-Martinez et al., if the stopper is to have an opening to pass an electrical cable into the encapsulated linear lighting 10, a rod can be suspended in the channel 20 between the dams.

Figure 3:
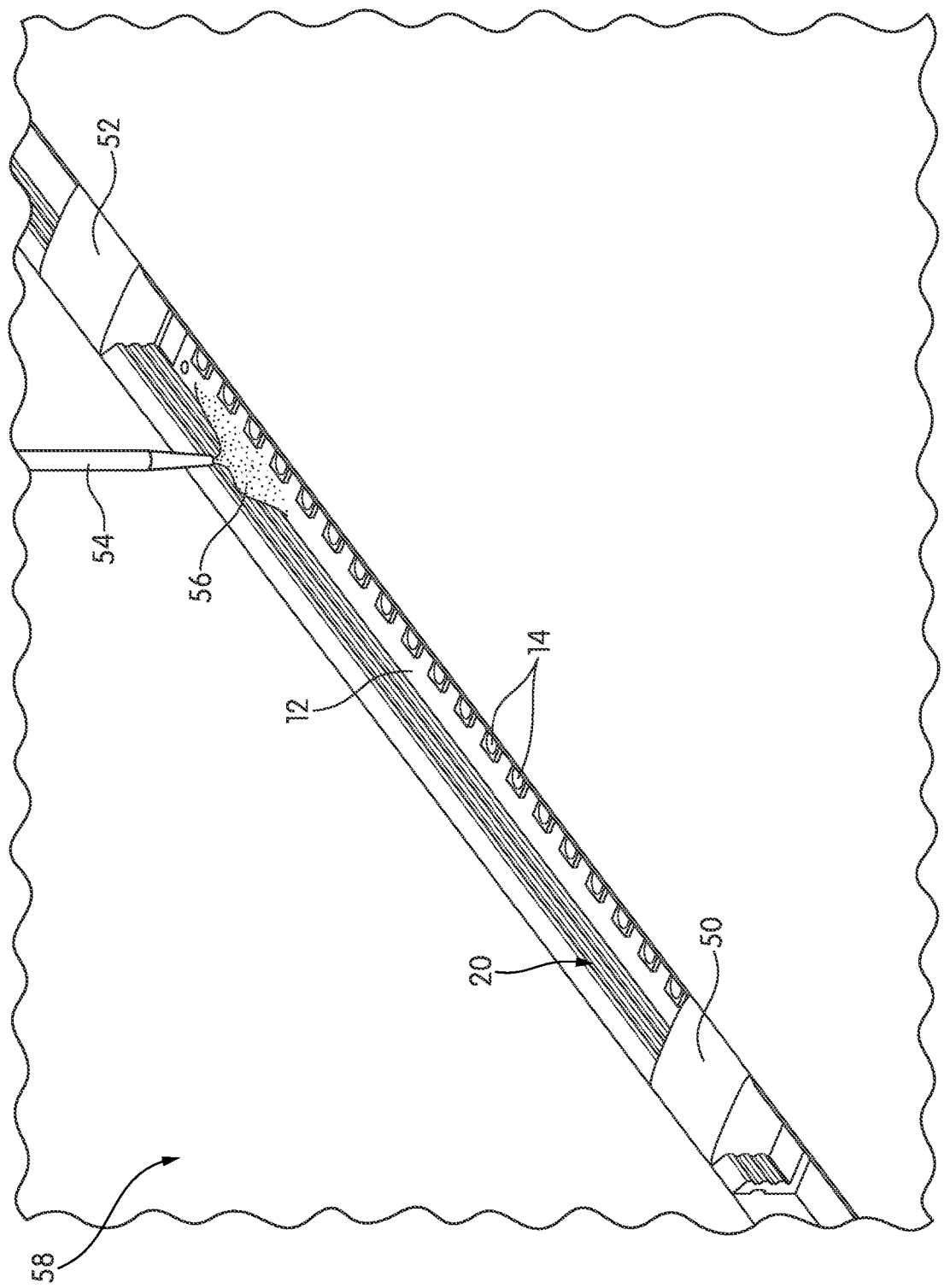
FIG. 3 is a perspective view illustrating a step in the manufacture of stoppers according to the method of FIG. 2.

This basic process of forming stoppers is illustrated in FIG. 3, a perspective view of a channel 20 with a PCB installed. Dams 50, 52 cover the ends of the channel 20, while a dispensing nozzle 54 dispenses material 56 into the channel 20. The Dams 50, 52 are typically shaped to engage with the ridges 26 of the sidewalls 23, and may be of any suitable material that will make a seal with the channel 20. For example, the dams 50, 52 may be metal or a polymer that will not react with or stick to the stopper material. For example, the dams 50, 52 may be made of a polymer such as polyurethane or of metal if the stoppers are to be made of silicone. As can also be seen, in this arrangement, the channel 20 fits within a carrier 58 that serves to support the channel 20 during the dispensing and curing process.

The stopper material is then caused or allowed to cure. This may involve a room temperature cure, or it may involve holding the stopper material at an elevated temperature, e.g., 45° C. or 65° C. (113° F. or 149° F.). In yet other cases, curing may involve exposing the uncured material to other types of energy, such as UV light. Once the stopper material is cured, it can be removed from the channel 20 and carrier 58 and cut to appropriate dimensions. The length of the stoppers will vary from embodiment to embodiment. Stopper lengths of at least 1 inch (2.54 cm) are typically used, and it has been found that greater length has at least some positive effect on the ability of the stopper to dam the channel 20. Since the arrangement of FIG. 3 allows stoppers to be made in great lengths, they can simply be cut to any desired length.

This description assumes that the stopper material is maintained in a degassed state, and that no degassing is necessary prior to curing. However, that may not always be the case, and mixed stopper material may be degassed by exposure to a vacuum or by localized application of heat by flame or blowtorch to burst observable bubbles. Because of the application to which the stoppers 80 are to be put, bubbles may only be an issue if they lie along the outer, interfacing surfaces of the stopper 80; bubbles within the bulk of the stopper 80 may be of no consequence.

Figure 4:
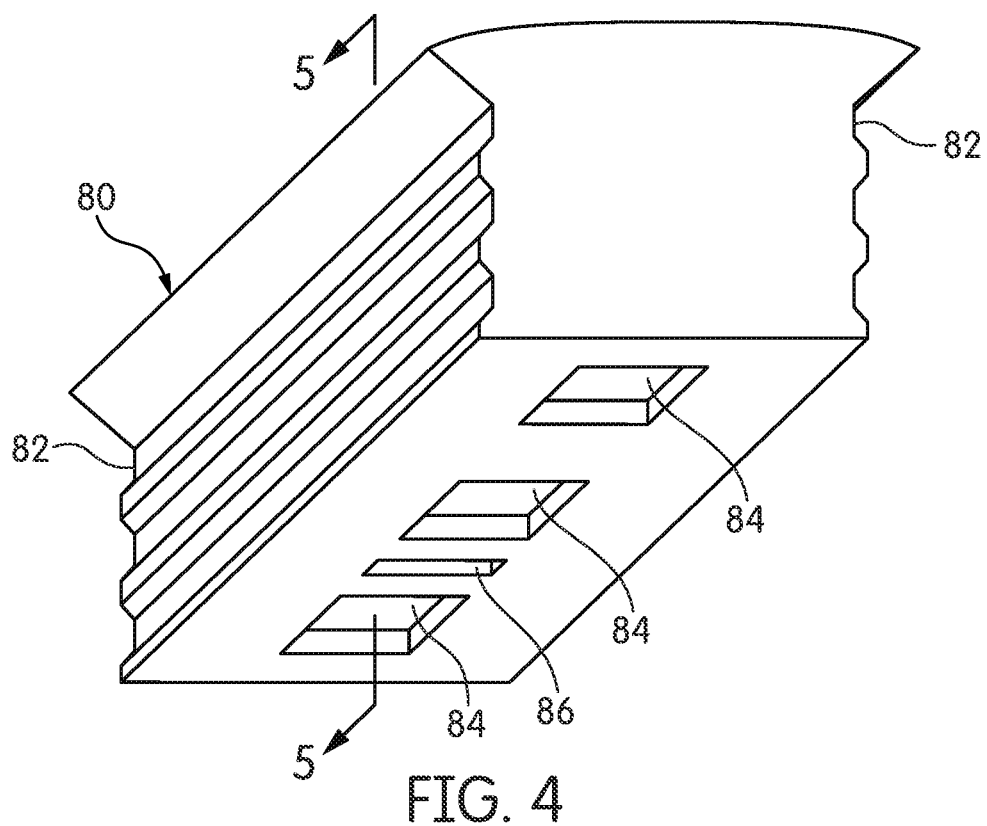
FIG. 4 is a perspective view of a stopper produced according to the method of FIG. 2.
Figure 5:
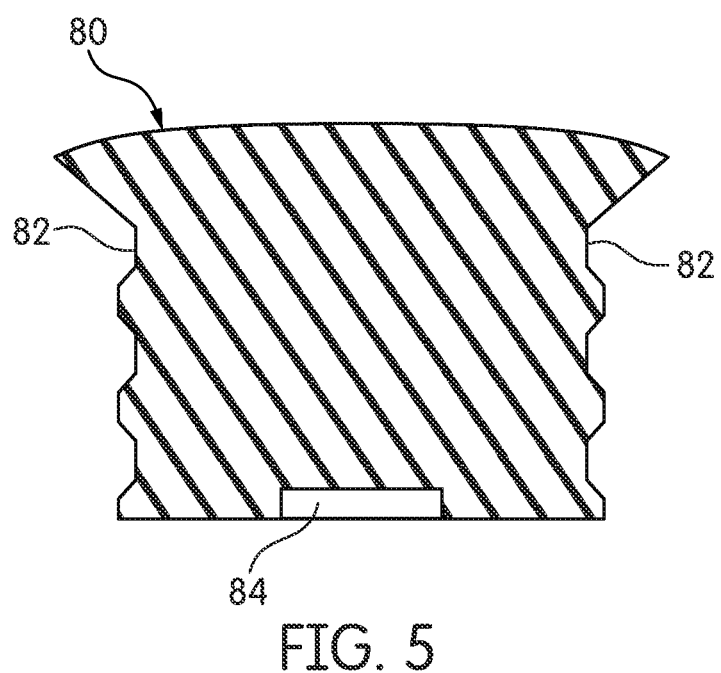
FIG. 5 is a cross-sectional view taken through Line 5-5 of FIG. 4.

FIG. 4 is a perspective view of a cured stopper 80, and FIG. 5 is cross-sectional view taken through Line 5-5 of FIG. 4. As shown, the stopper 80 has sets of complementary ridges 82 that are intended to engage the ridges 26 of the channel. Additionally, and different from stoppers used for other purposes, the stoppers 82 have structure complementary to the elements on the PCB, such as the LED light engines 14. These can be seen in the perspective view of FIG. 4. As shown, the stopper 80 has complementary negative impressions 84 for each of the LED light engines 84 and a complementary negative impression 86 for a resistor that is mounted on the PCB 12.

In a typical embodiment, a stopper 80 may have a length equal to the length of one repeating block of the PCB 12. As those of skill in the art will understand, PCBs 12 for linear lighting are usually laid out to have repeating blocks that are separated by cut points. A single repeating block is a self-contained lighting circuit; connected to power, it will light. Linear lighting PCBs 12 can be cut to length by cutting them at the cut points that separate repeating blocks. The physical length of a repeating block varies considerably depending on the PCB 12 but is typically in the range of 1-3 inches (2.5-5 cm). Since the usual length of a repeating block coincides with an advantageous length for a stopper 80, it is convenient to make stoppers 80 such that each stopper 80 covers one repeating block.

Because the stopper 80 is specific to both the channel 20 and the PCB 12, task 104 of method 100 would typically be repeated any time there is a change to either of those elements. Thus, different sets of stoppers 80 would be used for different types of channels 20 and different linear lighting PCBs 12. However, because stoppers 80 are usually reusable at least a few times, it is not necessary to make new stoppers 80 every time one wishes to encapsulate linear lighting. Thus, task 104 may not be performed every time one performs method 100.

Once appropriate stoppers 80 have been manufactured, method 100 continues with task 105. When one is manufacturing encapsulated linear lighting 10 of arbitrary length, and that encapsulated linear lighting 10 is, in many cases, longer than the working length or bed of the machine on which it is made, it can be assumed that there will be some limiting factor. Specifically, as one makes longer and longer encapsulated linear lighting 10, one may run out of either PCB 12 or channel 20.

Much of the remainder of this description assumes that one will run out of channel 20 before one runs out of PCB 12. This is because channel 20 is often produced on the same machine as the rest of the encapsulated linear lighting 10 and is thus subject to length limitations. Of course, if the channel 20 is extruded as described above, that may be true. Linear lighting PCB 12, on the other hand, can be made to any arbitrary length by soldering together individual sections or segments of PCB, usually at overlapping joints. Reels of linear lighting PCB 12 holding a single PCB 12 with a length in excess of 100 meters (328 ft) long are known and are frequently sold to distributors and installers who use large quantities of linear lighting. Thus, this description assumes that the channel 20 is the limiting factor.

Assuming that the length of the channel 20 is the limiting factor, task 105 involves measuring out and cutting the entire length of PCB 12 that is needed for a particular piece of encapsulated linear lighting 10. This length of PCB 12 may be 5 meters (16.4 ft), 10 meters (32.8 ft) or more. There is no particular limit to the length of PCB 12, nor is there a requirement that that length must be greater than the working length of the machine bed. Physical phenomena, like Ohmic voltage drop, may limit the length of PCB 12 that can be successfully powered from a single power connection along the PCB 12, but that limitation may be overcome by powering a single PCB 12 at multiple points. Generally speaking, the PCB 12 is cut to about the full desired length of the encapsulated linear lighting. Here, the term "about" refers to the fact that the PCB 12 may be at least a few millimeters shorter than the encapsulated linear lighting 10 on each end.

Once the PCB 12 is cut, method 100 continues with task 106, in which a channel 20 and PCB 12 are assembled for encapsulation. The PCB 12 typically has an adhesive backing with a release liner that prevents it from sticking to undesired surfaces. Any release liner is at least partially removed from the PCB 12, and the PCB 12 is pressed into the channel 20. The length of release liner that is removed may be equal to slightly longer than the length of the segment that is to be produced; that is, the release liner may be removed to a point just beyond the stopper 80. A roller may be applied to the PCB 12 on the channel 20 to cause the pressure-sensitive adhesive to engage thoroughly with the channel 20.

The stoppers 80 are placed in the channel 20, over the PCB 12, to dam a single segment of the PCB 12 and channel 20 for encapsulation. This appears much like the arrangement of FIG. 3. In this task, the stoppers 80 may be placed at the very end of the available channel 20. However, in many cases, it may be more helpful to place the stopper a short distance from the end of the available channel 20, e.g., about 1 inch (25 mm) from the end of the available channel 20. After the stoppers 80 have been placed, method 100 continues with task 108, and an initial segment is dosed with the encapsulating resin or resins and cured.

Task 108 may proceed in several stages, with several layers of resin of the same or various types laid down and cured. For example, it may be helpful to lay down a thin layer around the LED light engines 14 and cure that layer in order to reduce air bubbles before completely filling the channel 20 with resin. Generally speaking, the resins used in task 108 are of the same basic type or chemistry, e.g., they are all polyurethanes, but layers of resin may have different additives. For example, some of the resin used in task 108 may be transparent, while other resin of the same type may be merely translucent.

In the description above of method 100, some care is taken to see that the stoppers 80 will fit well in the channel 20 and over the PCB 12. However, the seal that the stoppers 80 make with the channel 20 and PCB 12 in task 108 need not be perfect or absolute. Some amount of leakage may be permitted, particularly in cases where the next segment is to be made using the same resin, so long as the leakage does not amount to an uncontrolled release.

As with the stopper material, the resin is caused or allowed to cure. Put otherwise, a two-part resin system may be adapted to cure by itself at room temperature, in which case, one need only allow that to happen. However, even if a two-part resin system will cure at room temperature, it often cures faster at elevated temperatures, and so the curing step may involve exposing the resin to higher temperatures, e.g., by baking for at least a few minutes in an oven. The temperatures used for this type of curing are often under 100° C. (212° F.) and may be, e.g., 35-65° C. (95-150° F.). Of course, some resin systems may require exposure to higher temperatures in order to cure. In other cases, curing may involve exposing the resin to other types of energy, such as UV light, or light of another particular frequency.

Additionally, while this description assumes that the resins are kept in a degassed state, as those of skill in the art will appreciate, some degassing steps may be needed. Degassing can be performed either by exposing the liquid resin to a vacuum to draw out bubbles or, for more localized disturbances, exposing the area locally to a flame or blowtorch to pop bubbles.

In some cases, the segment of encapsulated linear lighting 10 made in tasks 106 and 108 may be the functional length of the bed of the encapsulation machine. Alternatively, a manufacturer may choose not to use the entire length of the bed of the encapsulation machine. In either case, the segment made in tasks 106 and 108 may be shorter than desired. If so, it may be desirable to extend the length of the encapsulated linear lighting. Task 110 is a decision task. In task 110, if another segment of encapsulated linear lighting is to be produced, i.e., if the existing segment is to be extended in length (task 110:YES), method 100 continues with task 112. If the linear lighting is complete and has the requisite length, method 100 returns at task 120.

Figure 6:
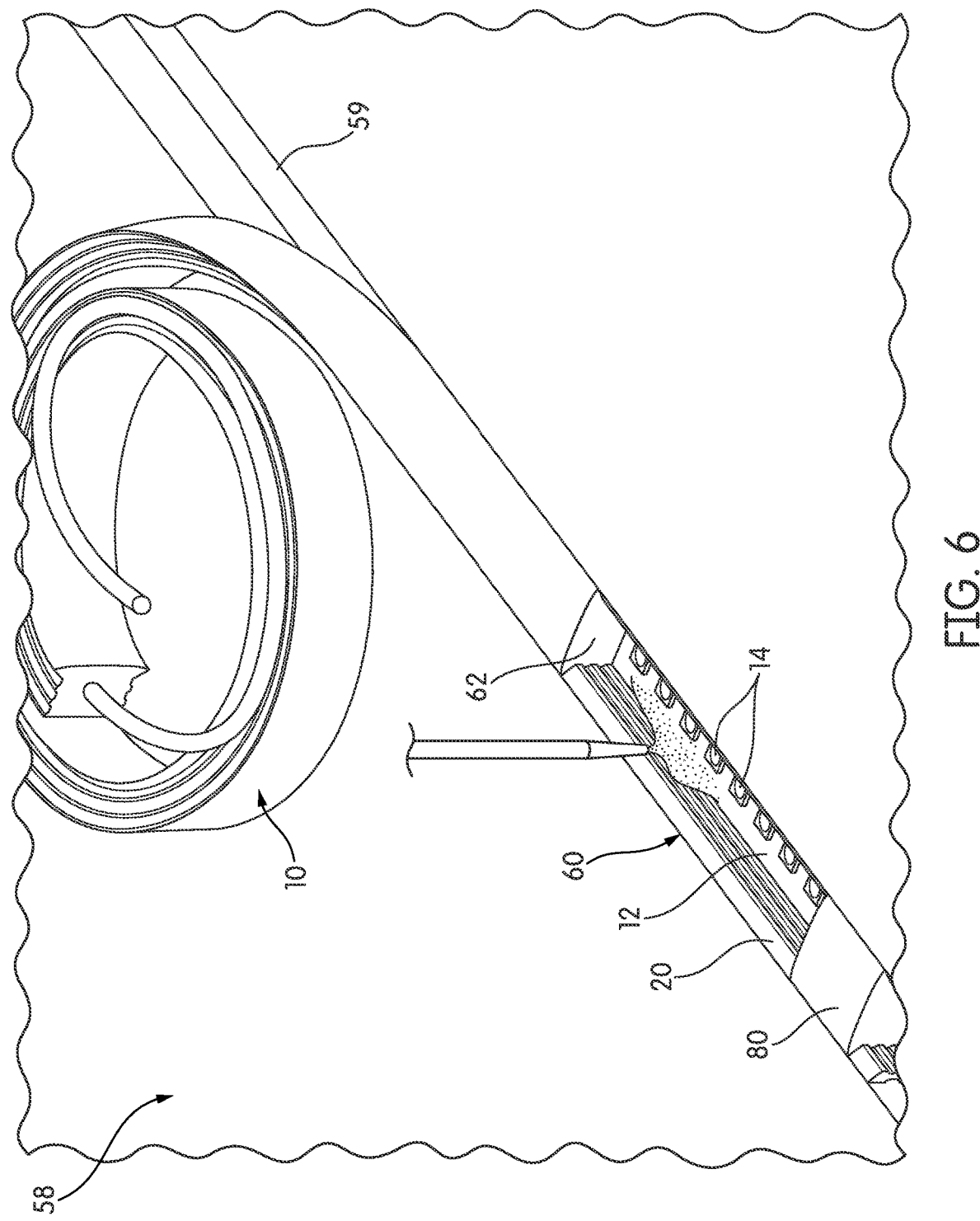
FIG. 6 is a perspective view illustrating the creation of a segment of encapsulated linear lighting.

In task 112, much of the linear lighting 10 that has been produced is removed from the carrier 58 and coiled on the carrier 58 or on the bed of the encapsulation machine, as shown in the perspective view of FIG. 6. However, the end 60 of the linear lighting 10 is left in the carrier 58. Preferably, as shown, some length of the linear lighting 10 is uncoiled and remains in the carrier 58 such that the end 60 of the linear lighting 10 lies flat in the carrier and is not subject to large torsional forces or stresses.

FIG. 6 also illustrates a point described above: beyond the stopper 80, a length of PCB 12 is present without underlying channel 20, because the PCB 12 has been cut to the final desired length.

At this point in method 100, some resin has been dosed into and cured in a channel 20. Assuming, as explained above, that the channel 20 is the limiting factor, in task 114, a decision task, there are two possibilities: either there is a segment of completed, encapsulated linear lighting with some unfilled channel 20 and unencapsulated PCB 12 extending from it, or the available length of channel 20 has been completely filled. FIG. 6 shows the former situation: the encapsulation of the last segment terminates at a vertical face 62 with an end 60 that has some unfilled channel 20 and unencapsulated PCB 12 protruding from it.

If there is an end 60 that has unfilled channel 20 with PCB 12 (task 114:NO), method 100 continues with task 118. In task 118, to continue making the linear lighting 10 and extending its length, one need only move the stopper 80 to a spot further along the channel 20 and PCB 12 and fill the space between the end face 62 of the last segment encapsulation and the relocated stopper 80 with resin. This is what is shown in FIG. 6.

As described above, the other possibility is that by task 114, one has filled the entire length of channel 20 that one was working with. In that case (task 114:YES), one is out of channel 20, and method 100 continues with task 116.

In task 116, a second channel 20 and PCB 12 are laid in the carrier 58 abutting the first. Specifically, FIG. 7 is a cross-sectional view of the carrier 58 in this stage of method 100. A fully encapsulated strip of linear lighting 10 lies to the right in the figure, with the cured resin and channel 20 serving as the covering 18 described above. A second channel 70 is laid in the carrier 58 so that it abuts the end of the previous channel 20, i.e., the now-finished strip of linear lighting 10. The release liner is removed from an appropriate length of the remaining loose PCB 12, and the PCB 12 is pressed into this new section of channel 70. A roller may be applied to the PCB 12 to activate pressure-sensitive adhesive and eliminate any air pockets between the PCB 12 and the channel 20, 70. A stopper 80 is placed in the second channel 70 at some appropriate location away from the abutment of the two channels 20, 70, typically with the adhesive of the PCB 12 exposed and pressed into the channel 70 to a point just beyond the stopper 80. Method 100 then proceeds normally with task 118.

In placing a second channel 70 next to the filled first channel 20, it may be helpful to trim the end of the encapsulation in order to ensure that the interface between the two channels 20, 70 is as mutually parallel as possible, in order to reduce any discontinuity.

As those of skill in the art will note, the two channels 20, 70 are merely abutted in this embodiment. The PCB 12 that extends over the joint and is pressed into both channels 20, 70 may provide some slight connection, but no particular attempt is made to join the two channels 20, 70 along their entire interface in task 116. However, when the segment containing the two abutted channels 20, 70 is dosed in task 118, the resin will fill any gap between the two channels 20, 70 and connect them. Any resin that might seep through the joint between the two channels 20, 70 is contained by the carrier 58, which has a slot 59 that tightly conforms to the dimensions of the channels 20, 70. The resulting discontinuity 30 in a finished piece of linear lighting 10 is expected to be small. In order to reduce light leaks, it may be helpful to use a translucent resin in the covering 18.

Method 100 returns to and continues with task 110 until there are no more segments and the encapsulated linear lighting 10 has been manufactured to its full, desired length.

Although much of the above description may assume that the PCB 12 is cut to the full desired length, that need not be the case in all embodiments. If it is necessary to add PCB 12 during method 100, that may be done, for example, by soldering jumper wires between the solder pads 19 of one section of PCB 12 and the corresponding solder pads 19 of the next section of PCB 12.

The above description also assumes that the linear lighting is so-called "top bend" linear lighting. However, methods according to embodiments of the invention may be applied to other configurations and orientations of linear lighting, including the so-called "side bend" linear lighting disclosed, e.g., in U.S. patent application Ser. No. 17/117,410, filed on Dec. 10, 2020, the contents of which are incorporated by reference herein in their entirety.

This description uses the term "about." When used, that term means that the specified numerical value or range may vary, so long as the described result stays the same. If it cannot be determined what range of values would cause the described result to stay the same, the term should be interpreted to mean±5%.

While the invention has been described with respect to certain embodiments, the description is intended to be exemplary, rather than limiting. Modifications and changes may be made within the scope of the invention, which is defined by the appended claims.

What is claimed is:

1. A method of making encapsulated linear lighting of a defined length in a segment-by-segment manner, comprising steps of:

disposing a first channel in a carrier and disposing a linear lighting printed circuit board (PCB) on an interior surface of the first channel extending therealong, the PCB having mounted thereon a plurality of electronic components including a plurality of light engines;

forming a first segment of the encapsulated linear lighting by damming the first channel using a first stopper in delimiting a first-segment resin-receiving channel portion, the first stopper being a conformal stopper with complementary negative impressions of 1) some of the electronic components disposed on the PCB and 2) features of the first channel, the first stopper being inserted into the first channel so as to overlie and seal against the PCB with a first subset of the electronic components that are mounted on the PCB being accommodated within the complementary negative impressions formed in the first stopper;

filling the first-segment resin-receiving channel portion with a resin to envelop therein a first PCB portion lying within the first-segment resin-receiving channel portion;

causing or allowing the resin in the first-segment resin-receiving channel portion to cure; and removing the first stopper from the first channel, thereby leaving the first segment of the encapsulated linear lighting formed in the first channel with an exposed end face and an unencapsulated extension portion of the PCB extending from the first segment of the encapsulated linear lighting;

forming an additional segment of the encapsulated linear lighting that is contiguous with the first segment of the encapsulated linear lighting at the exposed end face thereof by using a downstream stopper to delimit an additional-segment resin-receiving channel portion that is adjacent to the exposed end face of the first segment of the encapsulated linear lighting;

disposing the unencapsulated extension portion of the PCB in the additional-segment resin-receiving channel portion;

filling the additional-segment resin-receiving channel portion with the same resin used to fill the first-segment resin-receiving channel portion, thereby enveloping within the resin in the additional-segment resin-receiving channel portion at least a portion of the extension portion of the PCB; and causing or allowing the resin in the additional-segment resin-receiving channel portion to cure; and if needed, repeatedly forming further additional segments of the encapsulated linear lighting as necessary until the defined length of the encapsulated linear lighting is reached.

2. The method of claim 1, wherein the downstream stopper is a conformal stopper and, in being used to delimit the additional-segment resin-receiving channel portion, is positioned so as to overlie and seal against the unencapsulated extension portion of the PCB lying in the additional-segment resin-receiving channel portion, with a downstream subset of the electronic components that are mounted on the PCB being accommodated within complementary negative impressions formed in the downstream stopper.

3. The method of claim 2, wherein the first stopper is reused as the downstream stopper after the first segment of the encapsulated linear lighting has been formed in the first channel and the first stopper has been removed from the first channel.

4. The method of claim 1, wherein the downstream stopper is inserted into the first channel to dam the first channel such that the additional-segment resin-receiving channel portion is formed entirely as a portion of the first channel.

5. The method of claim 1, further comprising disposing a second channel in the carrier so as to abut the first channel in end-to-end fashion and disposing at least a portion of the unencapsulated extension portion of the PCB in the second channel, wherein the downstream stopper is inserted into the second channel to dam the second channel such that the additional-segment resin-receiving channel portion is formed at least partially in the second channel.

6. The method of claim 1, wherein segments of the encapsulated linear lighting that have been formed are removed from the carrier while leaving the exposed end face of, the unencapsulated extension portion of the PCB extending from, and at least a distal portion of the most-recently formed segment of the encapsulated linear lighting disposed within the carrier as the encapsulated linear lighting is being formed to reach the defined length.

7. The method of claim 1, wherein the PCB has been formed as a single continuous strip of about the full defined length of the encapsulated linear lighting prior to forming the first segment of the encapsulated linear lighting.

8. The method of claim 1, wherein the PCB is formed as a plurality of PCB segments joined together in electrically connected, end-to-end fashion.

9. The method of claim 8, wherein the PCB segments are joined together as successive portions of the encapsulated linear lighting are formed.

10. The method of claim 1, wherein the encapsulated linear lighting is made with a power cable that extends from an end thereof and that is electrically connected to the PCB near an encapsulated end of the PCB, the method further comprising arranging the power cable to pass through a cable-receiving stopper;

using the cable-receiving stopper with the power cable passing through it, delimiting a cable-segment resin-receiving channel portion;

filling the cable-segment resin-receiving channel portion with resin, thereby enveloping within the resin in the cable-segment resin-receiving channel portion the end of the PCB with the power cable electrically connected to it and a portion of the power cable; and causing or allowing the resin in the cable-segment resin-receiving channel portion to cure.

* * * * *